United States Patent
Wang

(10) Patent No.: US 6,517,960 B1
(45) Date of Patent: Feb. 11, 2003

(54) CERAMIC WITH ZIRCON COATING

(75) Inventor: Hongyu Wang, Niskayuna, NY (US)

(73) Assignee: General Electric Company, Niskayuna, NY (US)

( * ) Notice: Subject to any disclaimer, the term of this patent is extended or adjusted under 35 U.S.C. 154(b) by 0 days.

(21) Appl. No.: 09/299,417

(22) Filed: Apr. 26, 1999

(51) Int. Cl.$^7$ ............................................. B32B 9/00
(52) U.S. Cl. ...................... 428/701; 428/702; 428/698; 428/699; 428/446; 428/293.4; 416/241 B
(58) Field of Search ................... 428/698, 699, 428/701, 702, 293.4, 446; 416/241 R, 241 B

(56) References Cited

U.S. PATENT DOCUMENTS

| | | | |
|---|---|---|---|
| 4,146,670 A | * | 3/1979 | Rogers |
| 4,711,208 A | * | 12/1987 | Sander et al. |
| 4,738,227 A | * | 4/1988 | Kamo et al. |
| 4,950,558 A | * | 8/1990 | Sarin |
| 4,992,318 A | * | 2/1991 | Gadkaree |
| 5,067,998 A | * | 11/1991 | Singh et al. |
| 5,132,178 A | * | 7/1992 | Chyung et al. |
| 5,156,912 A | | 10/1992 | Lukco et al. |
| 5,305,726 A | * | 4/1994 | Scharman et al. |
| 5,320,909 A | * | 6/1994 | Scharman et al. |
| 5,391,404 A | | 2/1995 | Lee et al. |
| 5,441,762 A | | 8/1995 | Gray et al. |
| 5,466,280 A | * | 11/1995 | Lee et al. |
| 5,496,644 A | | 3/1996 | Lee et al. |
| 5,545,337 A | | 8/1996 | Hong |
| 5,683,824 A | * | 11/1997 | Kobayashi et al. |
| 5,683,825 A | * | 11/1997 | Bruce et al. |
| 5,705,231 A | | 1/1998 | Nissley et al. |
| 5,714,202 A | * | 2/1998 | Lemelson et al. |
| 5,723,213 A | | 3/1998 | Carpenter et al. |
| 5,736,248 A | | 4/1998 | Solntsev et al. |
| 5,740,515 A | | 4/1998 | Beele |
| 5,741,596 A | | 4/1998 | Skowronski et al. |
| 5,744,777 A | | 4/1998 | Bernecki et al. |
| 5,763,008 A | | 6/1998 | Sarin et al. |
| 5,763,106 A | | 6/1998 | Blanchard et al. |
| 5,780,178 A | | 7/1998 | Jones |
| 5,782,629 A | * | 7/1998 | Lannutti |
| 5,914,189 A | * | 6/1999 | Hasz et al. |
| 5,939,216 A | * | 8/1999 | Kameda et al. |
| 6,015,630 A | * | 1/2000 | Padture et al. |
| 6,054,184 A | * | 4/2000 | Bruce et al. |

FOREIGN PATENT DOCUMENTS

| | | |
|---|---|---|
| EP | 0480727 | 4/1992 |
| EP | 0508731 | 10/1992 |
| EP | 0826651 | 3/1998 |
| JP | 05238855 A | * 9/1993 |
| JP | 408020878 A | * 1/1996 |

OTHER PUBLICATIONS

Japanese Abstracts: JP 05238859; JP 05238855 and JP 7187865 No Month/Date.

* cited by examiner

Primary Examiner—Deborah Jones
Assistant Examiner—Jennifer McNeil
(74) Attorney, Agent, or Firm—Noreen C. Johnson; Christian G. Cabou

(57) ABSTRACT

An article comprises a silicon-containing substrate and a zircon coating. The article can comprise a silicon carbide/silicon (SiC/Si) substrate, a zircon (ZrSiO$_4$) intermediate coating and an external environmental/thermal barrier coating.

13 Claims, 3 Drawing Sheets

CERAMIC WITH ZIRCON COATING

This invention was made with government support under Contract No. NAS3-26385 awarded by NASA. The government may have certain rights in the invention.

BACKGROUND OF THE INVENTION

The invention relates to a composition that includes a silicon-containing substrate and a zircon coating.

Silicon-containing substrates are proposed for structures used in high temperature applications, such as in heat exchangers and advanced internal combustion engines. For example, silicon-based composite ceramics have been proposed as materials for applications in combustors for supersonic commercial airplanes. In many of these applications, the silicon-containing substrates are subjected to highly corrosive environments such as oxidative or reducing atmospheres and environments containing salts, water vapor or hydrogen. Silicon-containing substrates exhibit poor oxidation resistance and they may recede and lose mass under water-containing environments because of the formation of volatile species, such as silicon hydroxide [$Si(OH)_4$]. Hence, it is necessary to apply external environmental/thermal barrier coatings to these materials to provide protection from environmental attack at elevated temperatures.

Although an external environmental/thermal barrier coating is capable of preventing silicon-containing substrate materials from being in direct contact with the environment, typically the external coating is an oxide that has a high coefficient of thermal expansion (CTE). The difference between the coefficient of expansion (CTE) of the silicon-containing substrate and the coeffcient of thermal expansion (CTE) of the external environmental/thermal barrier coating can result in high stress and lead to coating failure. Further mullite, which is used as an intermediate bond coating between a silicon-containing substrate and an oxide external environmental/thermal coating, tends to crack because of the coefficient of thermal expansion (CTE) mismatch with a silicon carbide/silicon (SiC/Si) substrate. These cracks are detrimental to the function of the ceramic coating because they serve as fast transport paths for oxidizing and corrosive species to cause severe oxidation and corrosion at interface with the substrate. Additionally, cracks in the coating concentrate stresses. The cracks apply shear and tensile forces on the substrate to cause substrate fractures.

Thus, there is a need to provide a coating to a silicon-containing substrate that reduces stress and cracks in a ceramic composite.

SUMMARY OF THE INVENTION

The present invention provides a coating that reduces thermal expansion mismatch with a silicon-containing substrate and that can be applied as an intermediate layer or as an external coating in applications where water vapor is absent. The invention is an article that comprises a silicon-containing substrate and a zircon coating.

In another aspect, the invention relates to a method of forming an article, comprising forming a silicon-containing substrate and applying a zircon coating

DETAILED DESCRIPTION OF THE INVENTION

According to the invention, a coating composition comprising zircon is applied to a silicon-containing substrate to provide a coating with a coefficient of thermal expansion that approaches the coefficient of thermal expansion of the silicon-containing substrate.

For an infinite coating on a rigid substrate (very much thicker than the coating) stress in the coating due to thermal expansion mismatch ($\sigma_c$) is given by the formula:

$$\sigma_c = -2G_c(\alpha_c - \alpha_s)\Delta T((1+V_c)/(1-V_c)) \quad (1)$$

where $G_c$ is the shear modulus of the coating. The coefficient of thermal expansion (CTE) of a coating can be designated $\alpha_c$ and the coefficient of thermal expansion (CTE) of a substrate designated $\alpha_s$. $\Delta T$ is the temperature difference to which the coating and substrate are subjected and $V_c$ is the Poisson's ratio of a coating, which is the ratio of transverse contracting strain to elongated strain. In most cases, equation (1) is applicable to coatings on silicon-containing substrates and ceramic composites. Hence, stress generated in a coating is directly proportional to the difference between the coefficient of thermal expansion (CTE) of the coating $\{\alpha_c\}$ and the coefficient of thermal expansion (CTE) of the substrate $\{\alpha_s\}$.

Figure 1:
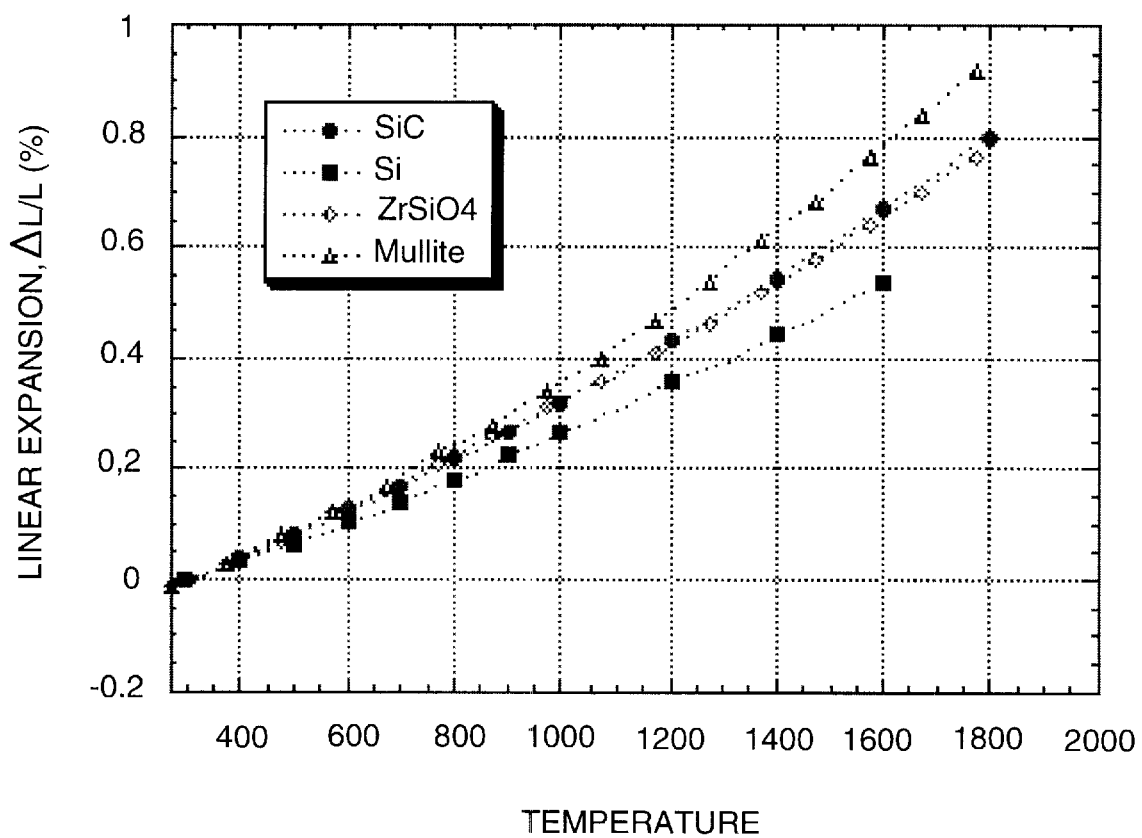
FIG. 1 is a graph illustrating comparative coefficients of thermal expansion (CTE's) for mullite, silicon carbide (SiC), silicon (Si) and zircon ($ZrSiO_4$)

FIG. 1 shows a comparison of the linear thermal expansion of mullite, zircon, silicon carbide and silicon as a function of temperature. Mullite has a higher thermal expansion than either silicon carbide (SiC) or silicon (Si). Zircon has a thermal expansion closer to those of both silicon (Si) and silicon carbide (SiC). Therefore, the stress in zircon due to thermal expansion mismatch is lower than that in mullite. The lower coefficient of thermal expansion (CTE) of zircon than that of silicon carbide (SiC) results in a compressive stress in the zircon coating during cooling. The compressive stress decreases the likelihood of coating cracking as zircon has a higher compressive strength than tensile strength.

Zircon comprises $ZrSiO_4$ or $ZrO_2 \cdot SiO_2$. It has an incongruent melting temperature of about 1680° C. Hence, it is adequate for most high temperature applications. Additionally, zircon has other advantages. A thin layer of silicon oxide ($SiO_2$) is formed on the surface of silicon (Si) and silicon-containing substrates due to the oxidation of silicon. Zirconia or one of various silicates can be used with the substrate as a water-resistant external coating. In these instances, a zircon intermediate coating has good chemical compatibility with both the underlying substrate and the external coating.

Suitable silicon-containing substrates include silicon carbide (SiC) and silicon nitride ($Si_3N_4$). The substrate can be a monolith or composite. A composite can comprise a reinforcing fiber, particulate or whisker and a silicon-based matrix. The matrix can be processed by melt infiltration (MI), chemical vapor infiltration (CVI) or other technique. Exemplary substrates include a monolithic silicon carbide (SiC) and silicon nitride ($Si_3N_4$), a silicon carbide (SiC) fiber-reinforced silicon carbide (SiC) matrix composite, carbon fiber-reinforced silicon carbide (SiC) matrix composite, and a silicon carbide (SiC) fiber-reinforced silicon nitride ($Si_3N_4$) composite. The preferred substrate comprises a silicon carbide (SiC) fiber-reinforced silicon carbide/silicon (SiC/Si) matrix composite processed by silicon melt infiltration.

Also suitable as silicon-containing substrates are silicon metal alloys. These alloys include niobium silicon alloys, molybdenum silicon alloys and the like.

The zircon coating can be applied to the substrate by chemical vapor deposition (CVD), thermal spray or by solution techniques such as sol-gel, slurry coating or colloidal suspension coating. Preoxidizing the silicon-containing substrate may be employed to improve adhesion of the zircon layer. A zirconia phase stabilizer, such as yttria ($Y_2O_3$), magnesia (MgO) or calcia (CaO) may be added to the zircon starting composition to stabilize the cubic phase and prevent volumetric changes while allowing the conversion to zircon to take place. A post-spray annealing process at appropriate temperatures (1100 to 1350° C.) may also be used to help the coating material reach an equilibrium state to improve its stability. Materials of different coefficients of thermal expansion (CTE's), such as zirconia ($ZrO_2$), alumina ($Al_2O_3$), cordierite ($2MgO.2Al_2O_3.5SiO_2$) and/or fused silica ($SiO_2$), may be added to the zircon to adjust its thermal expansion in case a better match with a substrate is desired. A constituent starting powder of the coating and stabilizer and/or modifier may be premixed through a vigorous mechanical process, such as ball milling, to provide interlocking of the powders and prevent segregation of phases due to density differences. For the same purpose, a sol-gel or colloidal process may be employed to coat the particles of one constituent with another.

The zircon coating of the invention can be used as an external coating in applications where water vapor is absent or as an intermediate layer with an external environmental/thermal barrier coating. The thickness of the zircon coating is determined by the application and the materials of the substrate and external coating. When the zircon coating is applied as an external barrier, it should completely cover the substrate. In this application, the coating is typically applied as a plasma deposited coating to a thickness between about 1 to about 20 mils (25 to 500 microns), preferably between about 2 to about 10 mils (50 to 250 microns). For applications where the zircon coating serves as a bond layer, its thickness can be determined by the CTE mismatch between the substrate and the external barrier coating and the magnitude of stresses generated as a result of the CTE mismatch. Typically for plasma deposited coatings, the thickness is between about 1 to 10 mils (25 to 250 microns), preferably about 2 to 5 mils (50 to 125 microns).

Suitable external barrier coatings in the zircon bond coat application comprise an oxide such as yttria-stabilized zirconia, scandia-stabilized zirconia, calcia-stabilized zirconia or magnesia-stabilized zirconia. Alumina and alumina silicates such as barium strontium aluminosilicate and calcium aluminosilicate are also typical external coating materials.

Preferably, a zircon coating is applied as an intermediate layer to a composite that comprises a silicon carbide/silicon (SiC/Si) substrate and a yttria-stabilized zirconia external environmental/thermal barrier coating. The following example is illustrative of the invention.

EXAMPLE

A zircon coating was sprayed by air plasma onto a ceramic composite substrate. The coating was deposited using a 23KW plasma gun, argon (Ar) as primary gas and hydrogen as secondary gas. The plasma gun to substrate distance was 1.5 inch. The ceramic substrate was a silicon carbide (SiC) fiber-reinforced silicon carbide/silicon (SiC/Si) matrix composite processed by silicon melt infiltration. The zircon coating was covered with a yttria-stabilized zirconia coating.

Figure 2:
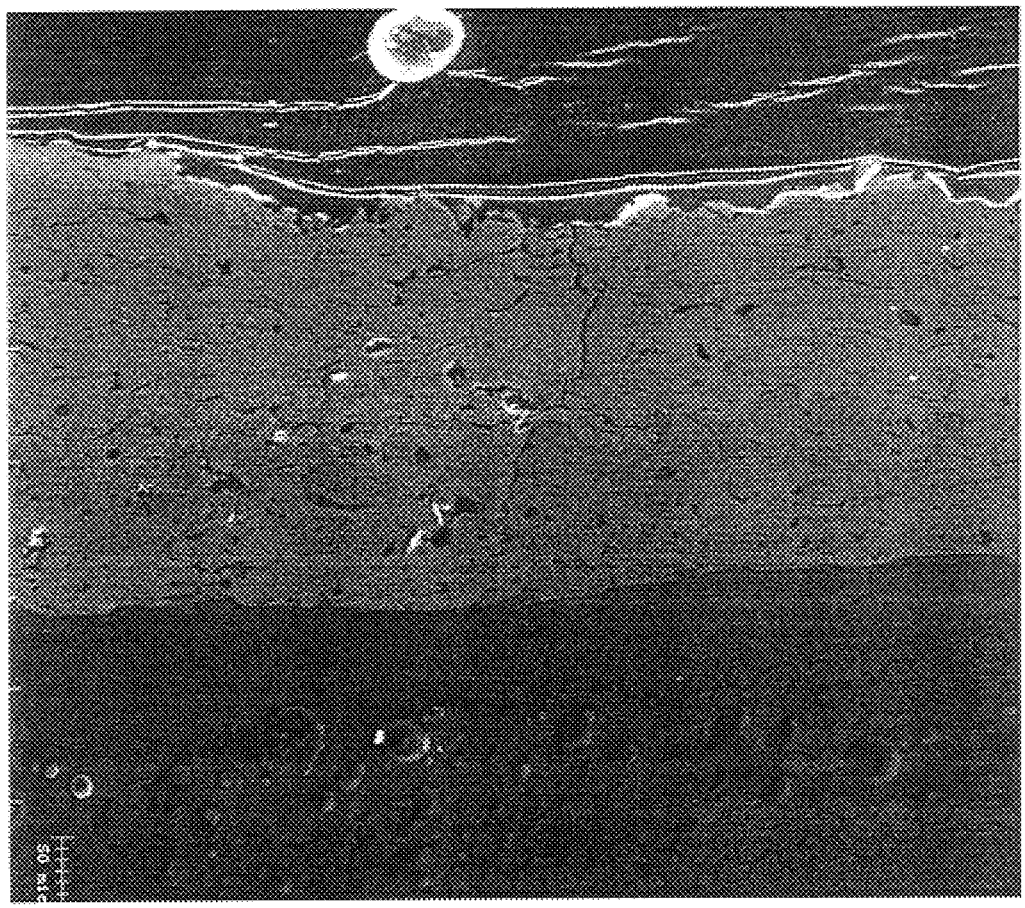
FIG. 2 is a photomicrograph of a silicon carbide (SiC) fiber-reinforced silicon carbide/silicon (SiC/Si) matrix composite processed by silicon melt infiltration coated with a zircon coating and yttria-stabilized zirconia external coating.
Figure 3:
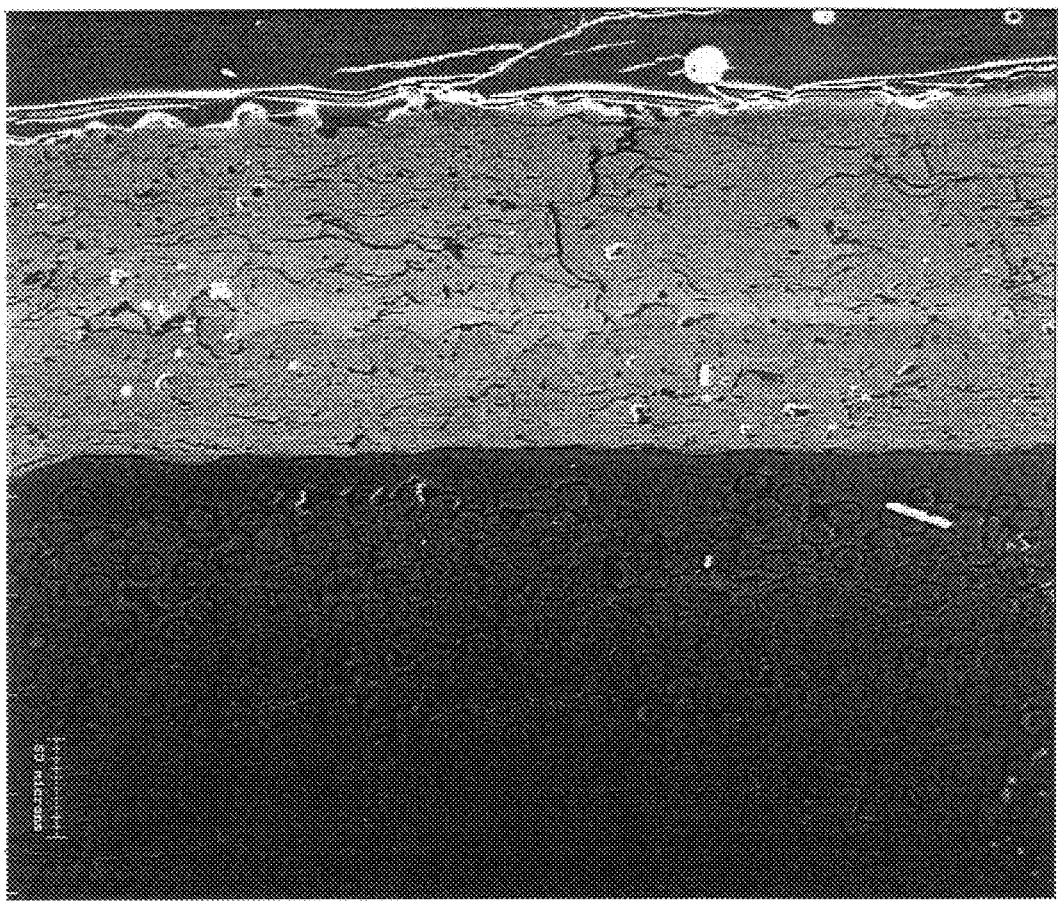
FIG. 3 is a photomicrograph of the same composite.

FIG. 2 and FIG. 3 are photomicrographs of the resulting composite and show that a zircon coating can be deposited by plasma spray and that the resultant coating is free of large cracks.

What is claimed:

1. An article, comprising a silicon-containing substrate and a 25 to 500 micron thick zircon coating containing a modifier selected from cordierite ($2MgO.2Al_2O_3.5SiO_2$), fused silica ($SiO_2$), silicon (Si) and mixtures thereof that modifies a coefficient of thermal expansion (CTE) of the zircon coating to a CTE that is closer to the CTE of the substrate, wherein said substrate is a composite comprising a silicon-based matrix and a reinforcing fiber, particulate or whisker.

2. The article of claim 1, wherein said zircon comprises $ZrSiO_4$.

3. The article of claim 1, wherein said substrate comprises silicon carbide (SiC) or silicon nitride ($Si_3N_4$).

4. The article of claim 1, wherein said substrate comprises a monolithic silicon carbide (SiC) or a monolithic silicon nitride ($Si_3N_4$).

5. The article of claim 1, wherein said substrate comprises a silicon carbide (SiC) fiber-reinforced silicon carbide (SiC) matrix composite, a carbon fiber-reinforced silicon carbide (SiC) matrix composite or a silicon carbide (SiC) fiber-reinforced silicon nitride ($Si_3N_4$) composite.

6. The article of claim 1, wherein said substrate comprises a silicon carbide (SiC) fiber-reinforced silicon carbide/silicon (SiC/Si) matrix composite processed by silicon melt infiltration.

7. The article of claim 1, wherein said zircon coating comprises a zirconia phase stabilizer.

8. The article of claim 7, wherein said phase stabilizer comprises yttria ($Y_2O_3$), magnesia (MgO) or calcia (CaO).

9. The article of claim 1, wherein said zircon coating is an external coating for application in an environment free from water vapor.

10. The article of claim 1, further comprising an oxide external environmental/thermal barrier coating.

11. The article of claim 10, wherein said oxide external environmental/thermal barrier coating is selected from the group consisting of yttria-stabilized zirconia, scandia-stabilized zirconia, calcia-stabilized zirconia, magnesia-stabilized zirconia and mixtures thereof.

12. The article of claim 1, shaped into an engine part.

13. The article of claim 12, wherein said part is a gas turbine engine part or an aircraft engine part.

* * * * *